United States Patent
Dong et al.

(10) Patent No.: US 12,516,988 B2
(45) Date of Patent: Jan. 6, 2026

(54) DISPERSION MEASUREMENT DEVICE AND METHOD BASED ON FRANSON SECOND-ORDER QUANTUM INTERFERENCE TECHNOLOGY

(71) Applicant: NATIONAL TIME SERVICE CENTER, THE CHINESE ACADEMY OF SCIENCES, Xi'an (CN)

(72) Inventors: Ruifang Dong, Xi'an (CN); Zhiguang Xia, Xi'an (CN); Xiao Xiang, Xi'an (CN); Run'ai Quan, Xi'an (CN); Tao Liu, Xi'an (CN); Shougang Zhang, Xi'an (CN)

(73) Assignee: NATIONAL TIME SERVICE CENTER, THE CHINESE ACADEMY OF SCIENCES, Xi'an (CN)

( * ) Notice: Subject to any disclaimer, the term of this patent is extended or adjusted under 35 U.S.C. 154(b) by 161 days.

(21) Appl. No.: 18/627,358

(22) Filed: Apr. 4, 2024

(65) Prior Publication Data
US 2025/0035490 A1 Jan. 30, 2025

(30) Foreign Application Priority Data
Jul. 27, 2023 (CN) .......................... 202310927786.0

(51) Int. Cl.
*G01J 9/02* (2006.01)

(52) U.S. Cl.
CPC .......... *G01J 9/02* (2013.01); *G01J 2009/0211* (2013.01); *G01J 2009/0226* (2013.01);
(Continued)

(58) Field of Classification Search
CPC ................. G01J 9/02; G01J 2009/0211; G01J 2009/0226; G01J 2009/0257;
(Continued)

(56) References Cited

U.S. PATENT DOCUMENTS 6,882,431 B2 * 4/2005 Teich ................. G01B 9/02091
356/497
9,294,191 B2 * 3/2016 Peters .................... H04B 10/70
(Continued)

*Primary Examiner* — Jonathan M Hansen
(74) *Attorney, Agent, or Firm* — BROADVIEW IP LAW, PC

(57) ABSTRACT

The present disclosure provides a dispersion measurement device and method based on a Franson second-order quantum interference technology. The device includes: an energy-time entangled twin-photon source configured to generate a plurality of optical signals, where the optical signals each include a signal photon and an idle photon; a polarization splitter configured to split the signal photon and the idle photon, and enable the signal photon to pass through a to-be-measured dispersive medium, such that a correlation time processing module records, under a width of a coincidence measurement integration window, first time of the idle photon arriving at a first single-photon detector, and second time of the signal photon arriving at a second single-photon detector, and obtains a twin-photon conference time width based on the first time and the second time; and a processing module.

20 Claims, 4 Drawing Sheets

(52) U.S. Cl.
CPC ............ *G01J 2009/0257* (2013.01); *G01J 2009/0261* (2013.01); *G01J 2009/028* (2013.01)

(58) Field of Classification Search
CPC ....... G01J 2009/0261; G01J 2009/028; G01M 11/338; G01M 11/331; G01M 11/0271
See application file for complete search history.

(56) References Cited

U.S. PATENT DOCUMENTS

2014/0099104 A1\* 4/2014 Peters ............... H04B 10/2507
398/25
2025/0003730 A1\* 1/2025 Kwiat ............... G01B 9/02007

\* cited by examiner

DISPERSION MEASUREMENT DEVICE AND METHOD BASED ON FRANSON SECOND-ORDER QUANTUM INTERFERENCE TECHNOLOGY

CROSS REFERENCE TO RELATED APPLICATION

This patent application claims the benefit and priority of Chinese Patent Application No. 202310927786.0, filed with the China National Intellectual Property Administration on Jul. 27, 2023, the disclosure of which is incorporated by reference herein in its entirety as part of the present application.

TECHNICAL FIELD

The present disclosure relates to the technical field of dispersion measurement, and specifically, to a dispersion measurement device and method based on a Franson second-order quantum interference technology.

BACKGROUND

At present, there are mainly two dispersion measurement methods: a phase shifting method and a white light interference method.

The phase shifting method calculates a relative group delay by measuring phase shifts of optical signals with different wavelengths after the optical signals pass through a dispersive medium. For the convenience of measuring the group delay, an optical carrier of a certain wavelength is divided into two optical carriers after being amplitude-modulated by a sinusoidal radio frequency (RF) signal. One optical carrier is directly connected to an output end as a reference signal, and the other optical carrier is used as a measured signal after passing through a measured dispersive medium. A phase shift varying with different wavelengths can be obtained by performing comparative measurement on the reference signal and the measured signal, and then the relative group delay can be obtained. With reference to a definition of the group delay, a dispersion curve of the measured dispersive medium can be further obtained through fitting and differentiating.

As an improvement of the phase shifting method mentioned above, a differential phase shifting method modulates the sinusoidal RF signal onto two optical carriers with different wavelengths through amplitude modulation, and measures relative phase shifts of the two optical signals after the two optical signals pass through the measured dispersive medium, thereby obtaining the relative group delay. However, if a wavelength of a selected optical carrier is far from a reference wavelength, or if a phase difference exceeds (-p, p), the phase shifting method is difficult to accurately distinguish the phase shift. Therefore, in order to avoid an inherent measurement ambiguity problem in the dispersion measurement method, it is required to select an appropriate modulation frequency and ensure that a wavelength adjustment step is small enough. This requires a tunable light source with high enough accuracy, which increases a measurement cost.

The white light interference method is implemented by combining a broadband time-incoherent light source with a Michelson or Mach Zehnder interferometer. One arm of the interferometer serves as a reference arm, while the other arm of the interferometer contains a to-be-measured dispersive medium. A white light interference pattern is obtained by scanning a relative time delay between the two arms. Relative phases of the two arms at different wavelengths can be extracted by processing the interference pattern, thereby obtaining a dispersion characteristic of the measured medium. However, the device also requires zero-delay datum reference and calibration of a phase interferometer during use, making implementation more complex.

SUMMARY

In order to resolve the above problems in the prior art, the present disclosure provides a dispersion measurement device and method based on a Franson second-order quantum interference technology. The technical problems to be resolved by the present disclosure are resolved by following technical solutions:

A dispersion measurement device based on a Franson second-order quantum interference technology is configured to measure a to-be-measured dispersive medium, and includes:

an energy-time entangled twin-photon source configured to generate a plurality of optical signals, where the optical signals each include a signal photon and an idle photon;

a polarization splitter configured to split the signal photon and the idle photon, and enable the signal photon to pass through the to-be-measured dispersive medium;

a first interference module configured to perform beam splitting on the idle photon, output idle photons obtained after the beam splitting to a first line and a second line respectively, delay the idle photon passing through the first line, and then perform beam combination on the delayed idle photon and the idle photon on the second line to enable the idle photons input from the first line and the second line to have a first preset arm length difference, such that after a first single-photon detector detects an idle photon obtained after the beam combination, a correlation time processing module records, under a width of a coincidence measurement integration window, first time of the idle photon arriving at the first single-photon detector;

a second interference module configured to perform beam splitting on the signal photon, output signal photons obtained after the beam splitting to a third line and a fourth line respectively, delay the signal photon passing through the third line, and then perform beam combination on the delayed signal photon and the signal photon on the fourth line to enable the signal photons input from the third line and the fourth line to have a second arm length difference, such that after a second single-photon detector detects a signal photon obtained after the beam combination, the correlation time processing module records, under the width of the coincidence measurement integration window, second time of the signal photon arriving at the second single-photon detector, wherein a delay length of the signal photon passing through the third line is determined by a delay length of the idle photon passing through the first line;

the correlation time processing module configured to obtain a coincidence count based on the first time and the second time; and a processing module configured to obtain a corresponding twin-photon time-domain coherence width based on the coincidence count, to calculate a dispersion value of the to-be-measured dispersive medium based on the twin-photon time-domain coherence width and the width of the coincidence measurement integration window.

In a specific implementation, the first interference module includes a first fiber splitter, a first single-mode fiber, a first fiber delay unit, and a first fiber combiner;

the first fiber splitter is configured to perform the beam splitting on the idle photon, and output the idle photons obtained after the beam splitting to the first fiber delay unit through the first line and to the first single-mode fiber through the second line respectively;

the first fiber delay unit is configured to delay the idle photon, such that the idle photons input from the first line and the second line have the first preset arm length difference; and the first fiber combiner is configured to perform the beam combination on the idle photons output through the first single-mode fiber and the first fiber delay unit.

In a specific implementation, the second interference module includes a second fiber splitter, a second single-mode fiber, a second fiber delay unit, and a second fiber combiner;

the second fiber splitter is configured to perform the beam splitting on the signal photon, and output the signal photons obtained after the beam splitting to the second fiber delay unit through the third line and to the second single-mode fiber through the fourth line respectively;

the second fiber delay unit is configured to delay the signal photon, such that the signal photons input from the third line and the fourth line have the second arm length difference; and the second fiber combiner is configured to perform the beam combination on the signal photons output through the second single-mode fiber and the second fiber delay unit.

In a specific implementation, the dispersion measurement device further includes:

a first polarization controller connected to the first single-mode fiber and configured to control a polarization characteristic of the first single-mode fiber, such that the idle photons transmitted on the first line and the second line have a same polarization; and a second polarization controller connected to the second single-mode fiber and configured to control a polarization characteristic of the second single-mode fiber, such that the signal photons transmitted on the third line and the fourth line have a same polarization.

In a specific implementation, both the first preset alarm length difference and the second alarm length difference are 500 ps to 1 ns.

In a specific implementation, a calculation formula of the processing module is as follows:

$$\Delta_{FI} = 2\Delta_0 \sqrt{1 + \frac{D^2}{\Delta_0^2 \tau^2}},$$

where $\Delta_0$ represents a single-photon coherence time width, $\tau$ represents the width of the coincidence measurement integration window, D represents a dispersion coefficient, and $\Delta_{FI}$ represents an interference atlas width.

In a specific implementation, when the width of the coincidence measurement integration window meets $\tau \ll |D|/\Delta_0$, a calculation formula of the processing module is as follows: $\Delta_{FI} \approx 2|D|/\tau$, where $\Delta_0$ represents a single-photon coherence time width, $\tau$ represents the width of the coincidence measurement integration window, D represents a dispersion coefficient, and $\Delta_{FI}$ represents an interference atlas width.

In a specific implementation, both the first interference module and the second interference module are fiber unequal-arm Mach Zehnder interferometers.

The present disclosure also provides a dispersion measurement method based on a Franson second-order quantum interference technology, which is applied to the dispersion measurement device based on a Franson second-order quantum interference technology, and includes:

step 1: adjusting a delay of a third line, such that a correlation time processing module measures coincidence counts of a signal photon and an idle photon at each delay setting position, and a processing module records a result and draws a graph to fit Franson interference;

step 2: setting a width $\tau$ of a coincidence measurement integration window through the correlation time processing module to ensure that time correlation distributions of the signal photon and the idle photon after the signal photon and the idle photon pass through a dispersive medium, a first interference module, and a second interference module are fully contained within a width range of the coincidence measurement integration window, and repeating the step 1 to obtain a Franson second-order quantum interference atlas that is not affected by dispersion, where a width of the Franson second-order quantum interference atlas is an original width $\Delta_0$;

step 3: setting, by using the correlation time processing module, the width of the coincidence measurement integration window to be much smaller than coincidence distribution widths of the signal photon and the idle photon, and repeating the step 2 to obtain an interference width $\Delta_{FI}(\tau)$ of the corresponding Franson second-order quantum interference atlas; and step 4: calculating a dispersion value |D| of a to-be-measured medium based on the $\Delta_0$ and the $\Delta_{FI}(\tau)$ that are respectively obtained in the steps 2 and 3.

In a specific implementation, the dispersion measurement method further includes:

step 5: setting a plurality of different widths $\tau$ of the coincidence measurement integration window through the correlation time processing module, repeating the steps 2 and 3 to obtain a plurality of interference widths $\Delta_{FI}(\tau)$ of the corresponding Franson second-order quantum interference atlas, and performing curve fitting on the different widths $\tau$ of the coincidence measurement integration window and the interference widths $\Delta_{FI}(\tau)$ of the corresponding Franson second-order quantum interference atlas to obtain the dispersion value |D| of the to-be-measured medium based on a fitting result.

The present disclosure has following beneficial effects:

The dispersion measurement device based on a Franson second-order quantum interference technology in the present disclosure polarizes a photon to obtain a signal photon and an idle photon by using a quantum interference technology, and measures a Franson second-order quantum interference atlas by using an interference device. Based on a measured width of the Franson second-order quantum interference atlas and a width of a coincidence measurement integration window, a dispersion coefficient of a to-be-measured medium at a center wavelength of a photon through which the to-be-measured medium passes is obtained. Therefore, measurement of the dispersion coefficient is no longer affected by measurement ambiguity and does not require a calibration light source, thereby ensuring accurate measurement of the dispersion coefficient of the to-be-measured medium.

The present disclosure will be further described below with reference to the accompanying drawings and the embodiments.

DETAILED DESCRIPTION OF THE EMBODIMENTS

Figure 1:
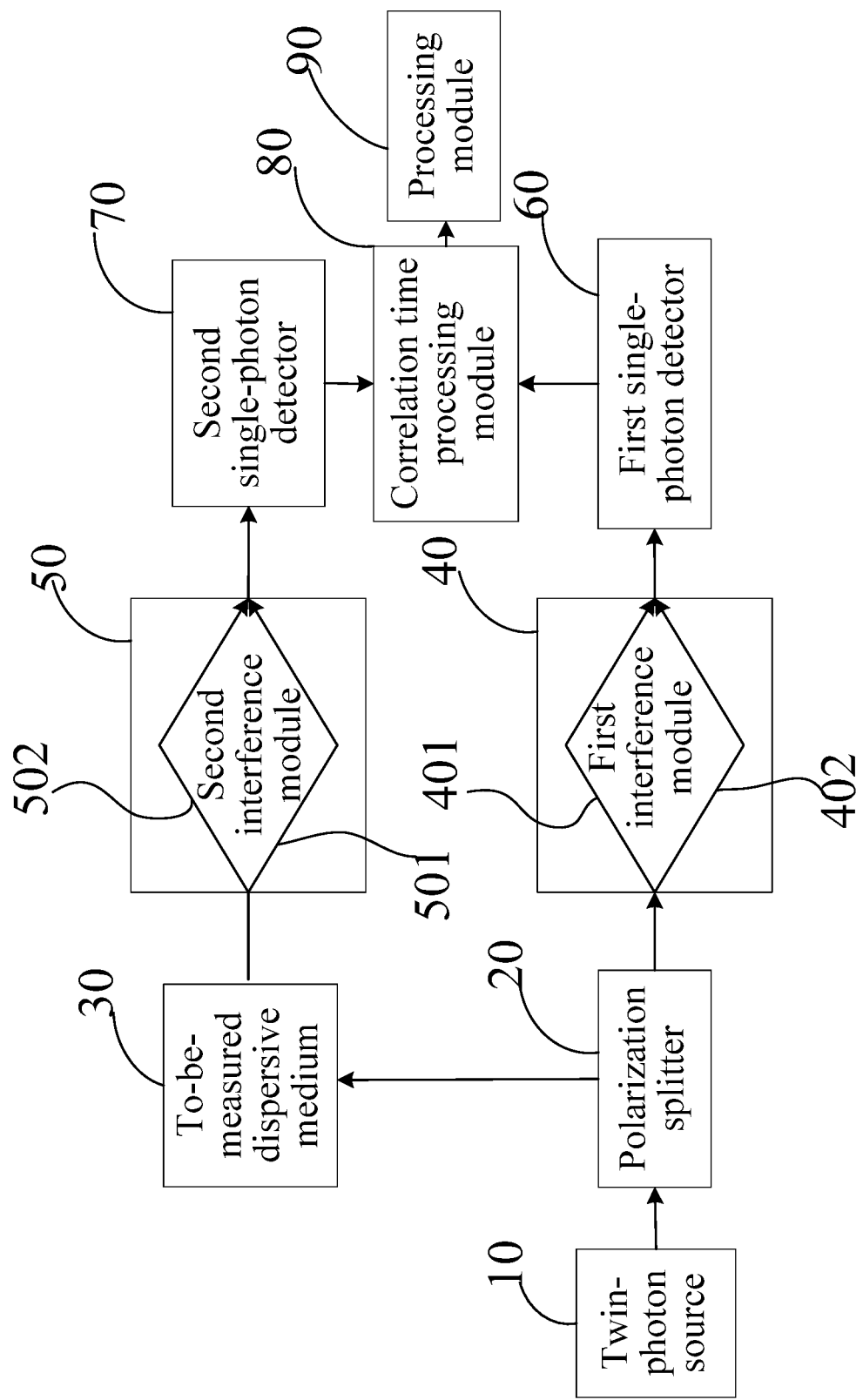
FIG. 1 is a block diagram of modules of a dispersion measurement device based on a Franson second-order quantum interference technology according to an embodiment of the present disclosure.
Figure 2:
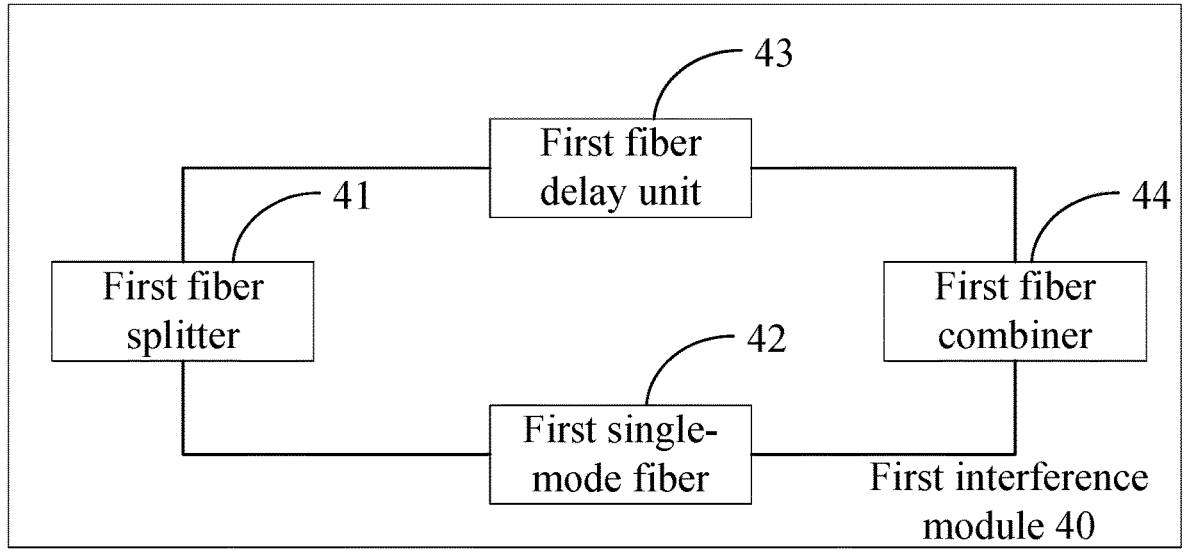
FIG. 2 is a block diagram of modules of a first interference module according to an embodiment of the present disclosure.
Figure 3:
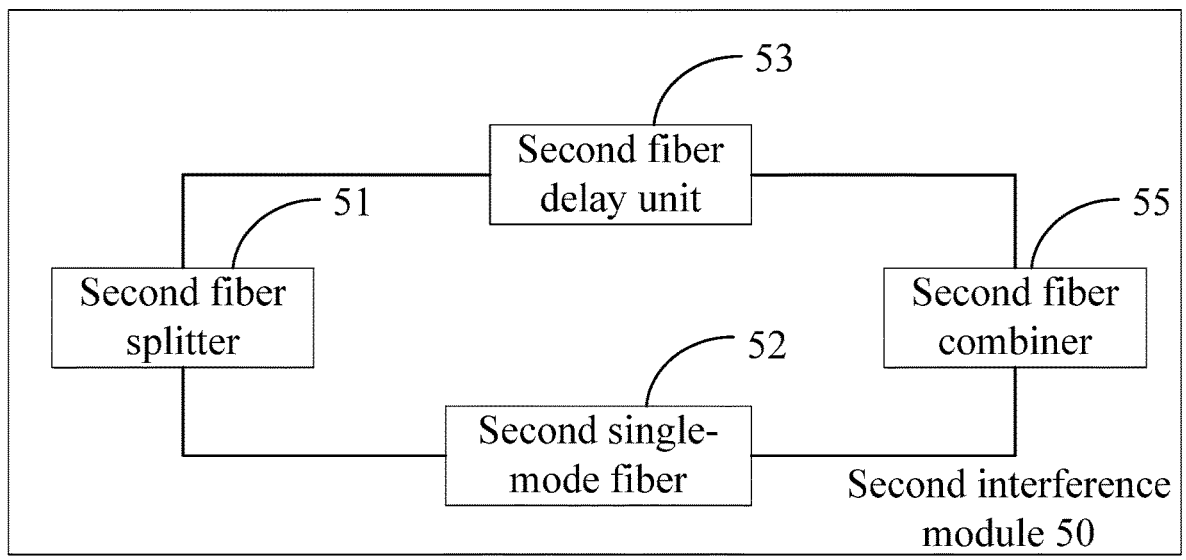
FIG. 3 is a block diagram of modules of a second interference module according to an embodiment of the present disclosure.
Figure 4:
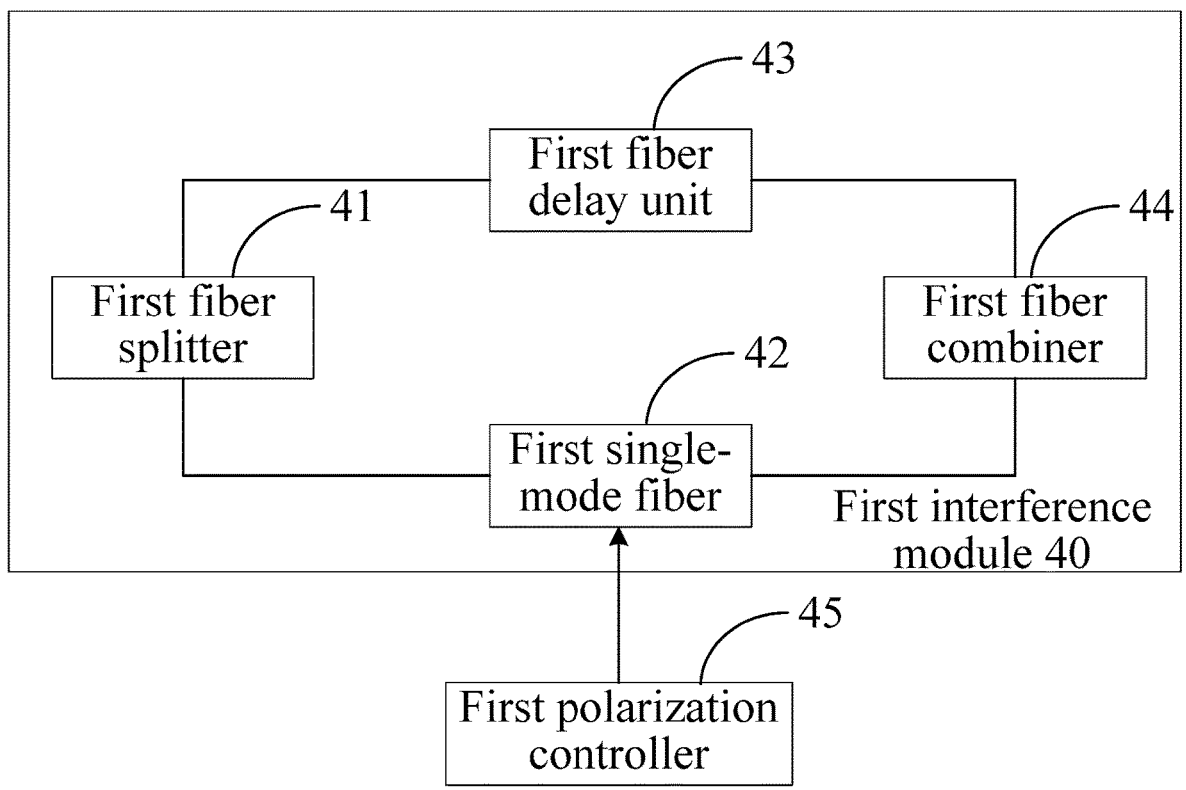
FIG. 4 is a block diagram of modules of another first interference module according to an embodiment of the present disclosure.
Figure 5:
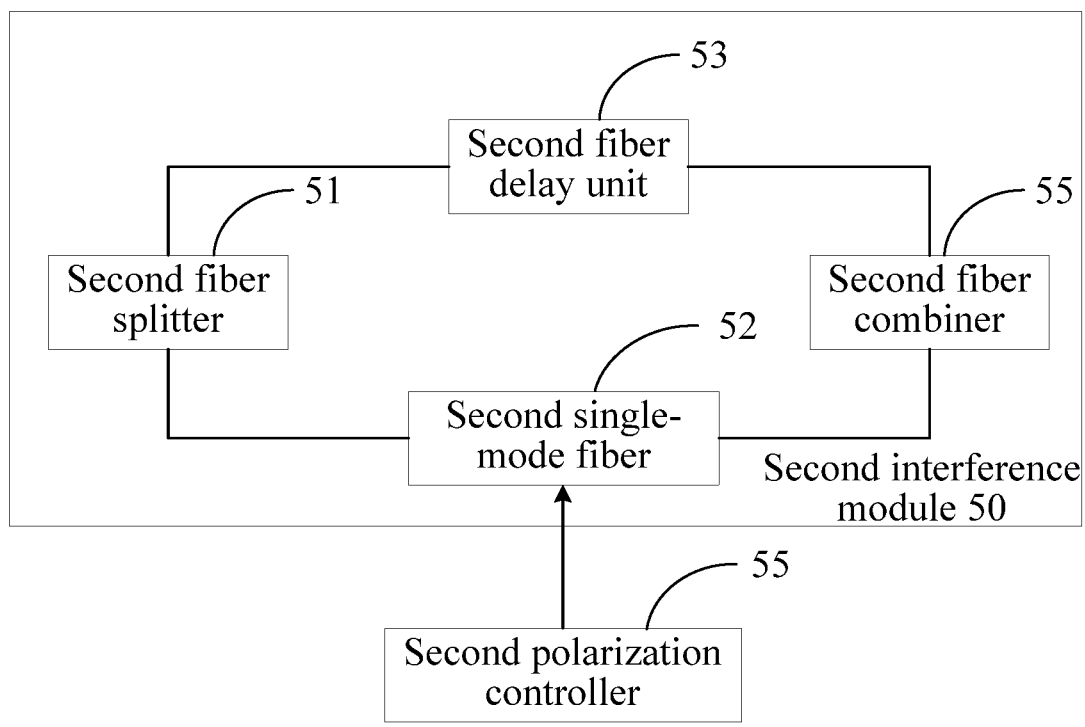
FIG. 5 is a block diagram of modules of another second interference module according to an embodiment of the present disclosure.

The present disclosure will be described in further detail below with reference to specific embodiments, but implementations of the present disclosure are not limited thereto.

Embodiment 1

Before the embodiments of the present disclosure are described, relevant principles and derivations are described. A visibility value and a width of a Franson second-order quantum interference atlas reflect entanglement mass and a time correlation width of an energy-time entangled twin-photon source. The inventor finds that after energy-time entangled twin photons pass through a dispersive medium (such as a fiber), the width of the Franson second-order quantum interference atlas is jointly affected by a coincidence measurement integration width and a dispersion coefficient. Based on this, a nonlinear optical crystal or waveguide (such as a PPKTP crystal or a PPLN waveguide) that meets a secondary-class phase matching condition is pumped by a continuous laser source. The twin-photon source with a time-energy entanglement characteristic generated in a parameter down-conversion process support mutually perpendicular polarizations and collinear transmission. A photon in a horizontal polarization direction is referred to as a signal photon, and a photon in a vertical polarization direction is referred to as an idle photon. An interference module is constituted by two unequal-arm interferometers with an arm length difference greater than a certain requirement. An input terminal of one of the unequal-arm interferometers is connected to an optical path of the signal photon, while an input terminal of the other unequal-arm interferometer is connected to an optical path of the idle photon. The dispersive medium is placed in one of arms. Output terminals of two interference modules are separately connected to a single-photon detector, and an event timer records time when the signal photon and the idle photon arrive at the single-photon detector. Then, a correlation time processing module measures a coincidence distribution between the signal photon and the idle photon, and measures the Franson second-order quantum interference atlas under a given coincidence measurement integration window. When the coincidence measurement integration window is small enough and dispersion is large enough, a ratio of the measured width of the Franson second-order quantum interference atlas to a width of the coincidence measurement integration window is a dispersion coefficient of a to-be-measured medium at a center wavelength of a photon through which the to-be-measured medium passes.

Assuming that a single-photon coherence time width of the energy-time entangled twin-photon source is $\Delta_0$, a time window width selected for coincidence measurement integration is $\tau$, and the dispersive medium is inserted into a transmission path of one alarm of the signal photon. When a dispersion coefficient of the inserted dispersive medium is D (a dispersion coefficient at a center frequency of a photon through which the dispersive medium passes through), an interference atlas width obtained based on a Franson second-order quantum interference measurement device can be expressed as follows:

$$\Delta_{FI} = 2\Delta_0 \sqrt{1 + \frac{D^2}{\Delta_0^2 \tau^2}}.$$

It should be noted that the widths given herein are all natural widths, and a full width at half maximum corresponding to the Franson second-order quantum interference atlas is $2\sqrt{2\ln 2}\Delta_{FI}$. It can be seen that when the width of the coincidence measurement integration window meets $\tau \ll |D|/\Delta_0$, $\Delta_{FI} \approx 2|D|/\tau$ can be obtained. That is, the width of the Franson second-order quantum interference atlas is a ratio of the dispersion coefficient to the width of the coincidence measurement integration window. Therefore, the dispersion coefficient can be directly calculated based on a ratio of a measured interference width to the width of the coincidence measurement integration window. This method is particularly useful for measuring a dispersion coefficient of a high-dispersion medium. When the $\tau \ll |D|/\Delta_0$ cannot be met, because the with of the coincidence measurement integration window can be flexibly changed through post-selection, second-order quantum interference widths obtained under different window widths can be fitted based on a representation of the interference atlas width to obtain the dispersion coefficient.

Based on a requirement of a Franson interference condition, alarm length differences between long and short arms of the two fiber unequal-arm interferometers should be much greater than single-photon coherence time of the entangled twin-photon source and much smaller than pump light coherence time. Assuming that the arm length differences of the fiber unequal-arm interferometers are respectively $\Delta T_1$ and $\Delta T_2$, a relationship that needs to be met can be expressed as follows: $\Delta_0 \ll \Delta T_1 \approx \Delta T_2 \ll T_p$, where $\Delta_0$ represents the single-photon coherence time, which is determined by a phase matching width of a nonlinear medium under a parameter down-conversion condition; and TP represents coherence time of continuous pump light. Generally, it is regarded that one of the $\Delta_0$ and the TP is far less than the other of the $\Delta_0$ and the TP when there is a difference of at least one order of magnitude between the $\Delta_0$ and the TP. For example, the $\Delta_0$ is generally at a picosecond level, while the TP is generally at a nanosecond level.

Based on the above principles, FIG. 1 is a block diagram of modules of a dispersion measurement device based on a Franson second-order quantum interference technology according to an embodiment of the present disclosure. The dispersion measurement device includes an energy-time entangled twin-photon source 10, a polarization splitter 20, a first interference module 40, a second interference module 50, a correlation time processing module 80, and a processing module 90.

The energy-time entangled twin-photon source 10 is configured to generate a plurality of optical signals, where the optical signals each include a signal photon and an idle photon.

The polarization splitter 20 is configured to split the signal photon and the idle photon, and enable the signal photon to pass through a to-be-measured dispersive medium 30.

The first interference module 40 is configured to perform beam splitting on the idle photon, output idle photons obtained after the beam splitting to a first line 401 and a second line 402 respectively, delay the idle photon passing through the first line 401, and then perform beam combination on the delayed idle photon and the idle photon on the second line 402 to enable the idle photons input from the first line 401 and the second line 402 to have a first preset arm length difference, such that after a first single-photon detector 60 detects an idle photon obtained after the beam combination, the correlation time processing module 80 records, under a width of a coincidence measurement integration window, first time of the idle photon arriving at the first single-photon detector 60. It should be noted that the first preset arm length difference is set based on a specific situation, and usually ranges from 500 ps to 1 ns.

The second interference module 50 is configured to perform beam splitting on the signal photon, output signal photons obtained after the beam splitting to a third line 501 and a fourth line 502 respectively, delay the signal photon passing through the third line 501, and then perform beam combination on the delayed signal photon and the signal photon on the fourth line 502 to enable the signal photons input from the third line 501 and the fourth line 502 to have a second arm length difference, such that after a second single-photon detector 70 detects a signal photon obtained after the beam combination, the correlation time processing module 80 records, under the width of the coincidence measurement integration window, second time of the signal photon arriving at the second single-photon detector 70. A delay length of the signal photon passing through the third line 501 is determined by a delay length of the idle photon passing through the first line 401.

The correlation time processing module 80 is configured to obtain a coincidence count based on the first time and the second time.

The processing module 90 is configured to obtain a corresponding twin-photon time-domain coherence width based on the coincidence count, to calculate a dispersion value of the to-be-measured dispersive medium based on the twin-photon time-domain coherence width and the width of the coincidence measurement integration window.

In a specific implementation, the first interference module 40 includes a first fiber splitter 41, a first single-mode fiber 42, a first fiber delay unit 43, and a first fiber combiner 44.

The first fiber splitter 41 is configured to perform the beam splitting on the idle photon, and output the idle photons obtained after the beam splitting to the first fiber delay unit 43 through the first line 401 and to the first single-mode fiber 42 through the second line 402 respectively. The fiber splitter is a 50/50 splitter.

The first fiber delay unit 43 is configured to delay the idle photon, such that the idle photons input from the first line 401 and the second line 402 have the first preset arm length difference. Preferably, the first fiber delay unit 43 is a manual fiber delay line.

The first fiber combiner 44 is configured to perform the beam combination on the idle photons output through the first single-mode fiber 42 and the first fiber delay unit 43. The first fiber combiner is a 2-in-1 fiber combiner.

In a specific implementation, the second interference module 50 includes a second fiber splitter 51, a second single-mode fiber 52, a second fiber delay unit 53, and a second fiber combiner 54.

The second fiber splitter 51 is configured to perform the beam splitting on the signal photon, and output the signal photons obtained after the beam splitting to the second fiber delay unit 53 through the third line 501 and to the second single-mode fiber 52 through the fourth line 502 respectively.

The second fiber delay unit 43 is configured to delay the signal photon, such that the signal photons input from the third line 501 and the fourth line 502 have the second arm length difference. Preferably, the second fiber delay unit 43 is an electric fiber delay line.

The second fiber combiner 54 is configured to perform the beam combination on the signal photons output through the second single-mode fiber 52 and the second fiber delay unit 53.

In a specific implementation, the dispersion measurement device further includes:
- a first polarization controller 45 connected to the first single-mode fiber 42 and configured to control a polarization characteristic of the first single-mode fiber 42, such that the idle photons transmitted on the first line 401 and the second line 402 have a same polarization; and
- a second polarization controller 55 connected to the second single-mode fiber 52 and configured to control a polarization characteristic of the second single-mode fiber 52, such that the signal photons transmitted on the third line 501 and the fourth line 502 have a same polarization.

In a specific implementation, both the first preset alarm length difference and the second alarm length difference are 500 ps to 1 ns, and the first preset alarm length difference and the second alarm length difference are different.

In a specific implementation, a calculation formula of the processing module is as follows:

$$\Delta_{FI} = 2\Delta_0 \sqrt{1 + \frac{D^2}{\Delta_0^2 \tau^2}}.$$

In the above formula, $\Delta_0$ represents a single-photon coherence time width, $\tau$ represents the width of the coincidence measurement integration window, $D$ represents a dispersion coefficient, and $\Delta_{FI}$ represents an interference atlas width.

In a specific implementation, when the width of the coincidence measurement integration window meets $\tau \ll |D|/\Delta_0$, a calculation formula of the processing module is as follows: $\Delta_{FI} \approx 2|D|/\tau$. In the above formula, $\Delta_0$ represents the single-photon coherence time width, $\tau$ represents the width of the coincidence measurement integration window, $D$ represents the dispersion coefficient, and $\Delta_{FI}$ represents the interference atlas width.

In a specific implementation, both the first interference module and the second interference module are fiber unequal-arm Mach Zehnder interferometers.

The dispersion measurement device based on a Franson second-order quantum interference technology in this embodiment polarizes a photon to obtain a signal photon and an idle photon by using a quantum interference technology, and measures a Franson second-order quantum interference atlas by using an interference device. Based on a measured width of the Franson second-order quantum interference atlas and a width of a coincidence measurement integration window, a dispersion coefficient of a to-be-measured medium at a center wavelength of a photon through which the to-be-measured medium passes is obtained. Therefore, measurement of the dispersion coefficient is no longer affected by measurement ambiguity and does not require a calibration light source, thereby ensuring accurate measurement of dispersion coefficient of the to-be-measured medium.

The present disclosure also provides a dispersion measurement method based on a Franson second-order quantum interference technology, which is applied to the dispersion measurement device based on a Franson second-order quantum interference technology, and includes following steps:

Step 1: Adjust a delay of a third line, such that a correlation time processing module measures coincidence counts of a signal photon and an idle photon at each delay setting position, and a processing module records a result and draws a graph to fit Franson interference, where when the delay of the third line is adjusted, it is necessary to keep a delay of a first line unchanged.

Step 2: Set a width $\tau$ of a coincidence measurement integration window through the correlation time processing module to ensure that time correlation distributions of the signal photon and the idle photon after the signal photon and the idle photon pass through a dispersive medium, a first interference module, and a second interference module are fully contained within a width range of the coincidence measurement integration window, and repeat the step 1 to obtain a Franson second-order quantum interference atlas that is not affected by dispersion, where a width of the Franson second-order quantum interference atlas is an original width $\Delta_0$.

Step 3: Set, by using the correlation time processing module, the width of the coincidence measurement integration window to be much smaller than coincidence distribution widths of the signal photon and the idle photon, and repeat the step 2 to obtain an interference width $\Delta_{FI}(\tau)$ of the corresponding Franson second-order quantum interference atlas, namely, a twin-photon coherence width.

Step 4: Calculate a dispersion value $|D|$ of a to-be-measured medium based on the $\Delta_0$ and the $\Delta_{FI}(\tau)$ that are respectively obtained in the steps 2 and 3.

In a specific implementation, the dispersion measurement method further includes a following step:

Step 5: Set a plurality of different widths $\tau$ of the coincidence measurement integration window through the correlation time processing module, repeat the steps 2 and 3 to obtain a plurality of interference widths $\Delta_{FI}(\tau)$ of the corresponding Franson second-order quantum interference atlas, and perform curve fitting on the different widths $\tau$ of the coincidence measurement integration window and the interference widths $\Delta_{FI}(\tau)$ of the corresponding Franson second-order quantum interference atlas to obtain the dispersion value $|D|$ of the to-be-measured medium based on a fitting result.

It should be noted that for dispersion measurement of a high-dispersion medium, the $\tau \ll |D|/\Delta_0$ can be directly set. The width of the Franson second-order quantum interference atlas is a ratio of a dispersion coefficient of a to-be measured medium at a center wavelength of the photon through which the to-be-measured medium passes to the width of the coincidence measurement integration window. Therefore, the dispersion coefficient can be directly calculated based on a ratio of a measured interference width to the width of the coincidence measurement integration window.

For measurement of dispersion values of a same to-be-measured dispersive medium at different frequencies, temperature adjustment can be performed on a nonlinear medium used to generate an entangled twin-photon source in this embodiment. A center frequency of a signal photon generated during parameter down-conversion can be changed by changing a working temperature of the nonlinear medium, such that the dispersion values of the dispersive medium at the different frequencies can be achieved through the measurement device described in the present disclosure.

What is claimed is:

1. A dispersion measurement device based on a Franson second-order quantum interference technology, configured to measure a to-be-measured dispersive medium, and comprising:
    an energy-time entangled twin-photon source configured to generate a plurality of optical signals, wherein the optical signals each comprise a signal photon and an idle photon;
    a polarization splitter configured to split the signal photon and the idle photon, and enable the signal photon to pass through the to-be-measured dispersive medium;
    a first interference module configured to perform beam splitting on the idle photon, output idle photons obtained after the beam splitting to a first line and a second line respectively, delay the idle photon passing through the first line, and then perform beam combination on the delayed idle photon and the idle photon on the second line to enable the idle photons input from the first line and the second line to have a first preset arm length difference, such that after a first single-photon detector detects an idle photon obtained after the beam combination, a correlation time processing module records, under a width of a coincidence measurement integration window, first time of the idle photon arriving at the first single-photon detector;
    a second interference module configured to perform beam splitting on the signal photon, output signal photons obtained after the beam splitting to a third line and a fourth line respectively, delay the signal photon passing through the third line, and then perform beam combination on the delayed signal photon and the signal photon on the fourth line to enable the signal photons input from the third line and the fourth line to have a second arm length difference, such that after a second single-photon detector detects a signal photon obtained after the beam combination, the correlation time processing module records, under the width of the coincidence measurement integration window, second time of the signal photon arriving at the second single-photon detector, wherein a delay length of the signal photon passing through the third line is determined by a delay length of the idle photon passing through the first line;

the correlation time processing module configured to obtain a coincidence count based on the first time and the second time; and a processing module configured to obtain a corresponding twin-photon time-domain coherence width based on the coincidence count, to calculate a dispersion value of the to-be-measured dispersive medium based on the twin-photon time-domain coherence width and the width of the coincidence measurement integration window.

2. The dispersion measurement device based on a Franson second-order quantum interference technology according to claim 1, wherein the first interference module comprises a first fiber splitter, a first single-mode fiber, a first fiber delay unit, and a first fiber combiner;

the first fiber splitter is configured to perform the beam splitting on the idle photon, and output the idle photons obtained after the beam splitting to the first fiber delay unit through the first line and to the first single-mode fiber through the second line respectively;

the first fiber delay unit is configured to delay the idle photon, such that the idle photons input from the first line and the second line have the first preset arm length difference; and the first fiber combiner is configured to perform the beam combination on the idle photons output through the first single-mode fiber and the first fiber delay unit.

3. The dispersion measurement device based on a Franson second-order quantum interference technology according to claim 1, wherein the second interference module comprises a second fiber splitter, a second single-mode fiber, a second fiber delay unit, and a second fiber combiner;

the second fiber splitter is configured to perform the beam splitting on the signal photon, and output the signal photons obtained after the beam splitting to the second fiber delay unit through the third line and to the second single-mode fiber through the fourth line respectively;

the second fiber delay unit is configured to delay the signal photon, such that the signal photons input from the third line and the fourth line have the second arm length difference; and the second fiber combiner is configured to perform the beam combination on the signal photons output through the second single-mode fiber and the second fiber delay unit.

4. The dispersion measurement device based on a Franson second-order quantum interference technology according to claim 3, further comprising:

a first polarization controller connected to the first single-mode fiber and configured to control a polarization characteristic of the first single-mode fiber, such that the idle photons transmitted on the first line and the second line have a same polarization; and a second polarization controller connected to the second single-mode fiber and configured to control a polarization characteristic of the second single-mode fiber, such that the signal photons transmitted on the third line and the fourth line have a same polarization.

5. The dispersion measurement device based on a Franson second-order quantum interference technology according to claim 1, wherein both the first preset arm length difference and the second arm length difference are 500 ps to 1 ns.

6. The dispersion measurement device based on a Franson second-order quantum interference technology according to claim 1, wherein a calculation formula of the processing module is as follows:

$$\Delta_{FI} = 2\Delta_0 \sqrt{1 + \frac{D^2}{\Delta_0^2 \tau^2}},$$

wherein $\Delta_0$ represents a single-photon coherence time width, $\tau$ represents the width of the coincidence measurement integration window, D represents a dispersion coefficient, and $\Delta_{FI}$ represents an interference atlas width.

7. The dispersion measurement device based on a Franson second-order quantum interference technology according to claim 1, wherein when the width of the coincidence measurement integration window meets $\tau < |D|/\Delta_0$, a calculation formula of the processing module is as follows: $\Delta_{FI} \approx 2|D|/\tau$, wherein $\Delta_0$ represents a single-photon coherence time width, $\tau$ represents the width of the coincidence measurement integration window, D represents a dispersion coefficient, and $\Delta_{FI}$ represents an interference atlas width.

8. The dispersion measurement device based on a Franson second-order quantum interference technology according to claim 1, wherein both the first interference module and the second interference module are fiber unequal-arm Mach Zehnder interferometers.

9. A dispersion measurement method based on a Franson second-order quantum interference technology, applied to the dispersion measurement device based on a Franson second-order quantum interference technology according to claim 1, and comprising:

step 1: adjusting a delay of a third line, such that the correlation time processing module measures coincidence counts of a signal photon and an idle photon at each delay setting position, and the processing module records a result and draws a graph to fit Franson interference;

step 2: setting a width $\tau$ of a coincidence measurement integration window through the correlation time processing module to ensure that time correlation distributions of the signal photon and the idle photon after the signal photon and the idle photon pass through a dispersive medium, a first interference module, and a second interference module are fully contained within a width range of the coincidence measurement integration window, and repeating the step 1 to obtain a Franson second-order quantum interference atlas that is not affected by dispersion, wherein a width of the Franson second-order quantum interference atlas is an original width $\Delta_0$;

step 3: setting, by using the correlation time processing module, the width of the coincidence measurement integration window to be much smaller than coincidence distribution widths of the signal photon and the idle photon, and repeating the step 2 to obtain an interference width $\Delta_{FI}(\tau)$ of the corresponding Franson second-order quantum interference atlas; and step 4: calculating a dispersion value |D| of a to-be-measured medium based on the $\Delta_0$ and the $\Delta_{FI}(\tau)$ that are respectively obtained in the steps 2 and 3.

10. The dispersion measurement method based on a Franson second-order quantum interference technology according to claim 9, wherein the first interference module comprises a first fiber splitter, a first single-mode fiber, a first fiber delay unit, and a first fiber combiner;

the first fiber splitter is configured to perform the beam splitting on the idle photon, and output the idle photons obtained after the beam splitting to the first fiber delay unit through the first line and to the first single-mode fiber through the second line respectively;

the first fiber delay unit is configured to delay the idle photon, such that the idle photons input from the first line and the second line have the first preset arm length difference; and the first fiber combiner is configured to perform the beam combination on the idle photons output through the first single-mode fiber and the first fiber delay unit.

11. The dispersion measurement method based on a Franson second-order quantum interference technology according to claim 9, wherein the second interference module comprises a second fiber splitter, a second single-mode fiber, a second fiber delay unit, and a second fiber combiner;

the second fiber splitter is configured to perform the beam splitting on the signal photon, and output the signal photons obtained after the beam splitting to the second fiber delay unit through the third line and to the second single-mode fiber through the fourth line respectively;

the second fiber delay unit is configured to delay the signal photon, such that the signal photons input from the third line and the fourth line have the second arm length difference; and the second fiber combiner is configured to perform the beam combination on the signal photons output through the second single-mode fiber and the second fiber delay unit.

12. The dispersion measurement method based on a Franson second-order quantum interference technology according to claim 11, further comprising:

a first polarization controller connected to the first single-mode fiber and configured to control a polarization characteristic of the first single-mode fiber, such that the idle photons transmitted on the first line and the second line have a same polarization; and a second polarization controller connected to the second single-mode fiber and configured to control a polarization characteristic of the second single-mode fiber, such that the signal photons transmitted on the third line and the fourth line have a same polarization.

13. The dispersion measurement method based on a Franson second-order quantum interference technology according to claim 9, wherein both the first preset arm length difference and the second arm length difference are 500 ps to 1 ns.

14. The dispersion measurement method based on a Franson second-order quantum interference technology according to claim 9, wherein a calculation formula of the processing module is as follows:

$$\Delta_{FI} = 2\Delta_0 \sqrt{1 + \frac{D^2}{\Delta_0^2 \tau^2}},$$

wherein $\Delta_0$ represents a single-photon coherence time width, $\tau$ represents the width of the coincidence measurement integration window, D represents a dispersion coefficient, and $\Delta_{FI}$ represents an interference atlas width.

15. The dispersion measurement method based on a Franson second-order quantum interference technology according to claim 9, wherein when the width of the coincidence measurement integration window meets $\tau << |D|/\Delta_0$, a calculation formula of the processing module is as follows: $\Delta_{FI} \approx 2|D|/\tau$, wherein $\Delta_0$ represents a single-photon coherence time width, $\tau$ represents the width of the coincidence measurement integration window, D represents a dispersion coefficient, and $\Delta_{FI}$ represents an interference atlas width.

16. The dispersion measurement method based on a Franson second-order quantum interference technology according to claim 9, wherein both the first interference module and the second interference module are fiber unequal-arm Mach Zehnder interferometers.

17. The dispersion measurement method based on a Franson second-order quantum interference technology according to claim 9, further comprising:

step 5: setting a plurality of different widths $\tau$ of the coincidence measurement integration window through the correlation time processing module, repeating the steps 2 and 3 to obtain a plurality of interference widths $\Delta_{FI}(\tau)$ of the corresponding Franson second-order quantum interference atlas, and performing curve fitting on the different widths $\tau$ of the coincidence measurement integration window and the interference widths $\Delta_{FI}(\tau)$ of the corresponding Franson second-order quantum interference atlas to obtain the dispersion value $|D|$ of the to-be-measured medium based on a fitting result.

18. The dispersion measurement method based on a Franson second-order quantum interference technology according to claim 10, further comprising:

step 5: setting a plurality of different widths $\tau$ of the coincidence measurement integration window through the correlation time processing module, repeating the steps 2 and 3 to obtain a plurality of interference widths $\Delta_{FI}(\tau)$ of the corresponding Franson second-order quantum interference atlas, and performing curve fitting on the different widths $\tau$ of the coincidence measurement integration window and the interference widths $\Delta_{FI}(\tau)$ of the corresponding Franson second-order quantum interference atlas to obtain the dispersion value $|D|$ of the to-be-measured medium based on a fitting result.

19. The dispersion measurement method based on a Franson second-order quantum interference technology according to claim 11, further comprising:

step 5: setting a plurality of different widths $\tau$ of the coincidence measurement integration window through the correlation time processing module, repeating the steps 2 and 3 to obtain a plurality of interference widths $\Delta_{FI}(\tau)$ of the corresponding Franson second-order quantum interference atlas, and performing curve fitting on the different widths $\tau$ of the coincidence measurement integration window and the interference widths $\Delta_{FI}(\tau)$ of the corresponding Franson second-order quantum interference atlas to obtain the dispersion value $|D|$ of the to-be-measured medium based on a fitting result.

20. The dispersion measurement method based on a Franson second-order quantum interference technology according to claim 12, further comprising:

step 5: setting a plurality of different widths $\tau$ of the coincidence measurement integration window through the correlation time processing module, repeating the steps 2 and 3 to obtain a plurality of interference widths $\Delta_{FI}(\tau)$ of the corresponding Franson second-order quantum interference atlas, and performing curve fitting on the different widths $\tau$ of the coincidence measurement integration window and the interference widths $\Delta_{FI}(\tau)$ of the corresponding Franson second-order quantum interference atlas to obtain the dispersion value $|D|$ of the to-be-measured medium based on a fitting result.

* * * * *